J. H. STEPHENS.
HOSE COUPLING.
APPLICATION FILED JUNE 16, 1908.
951,516.
Patented Mar. 8, 1910.
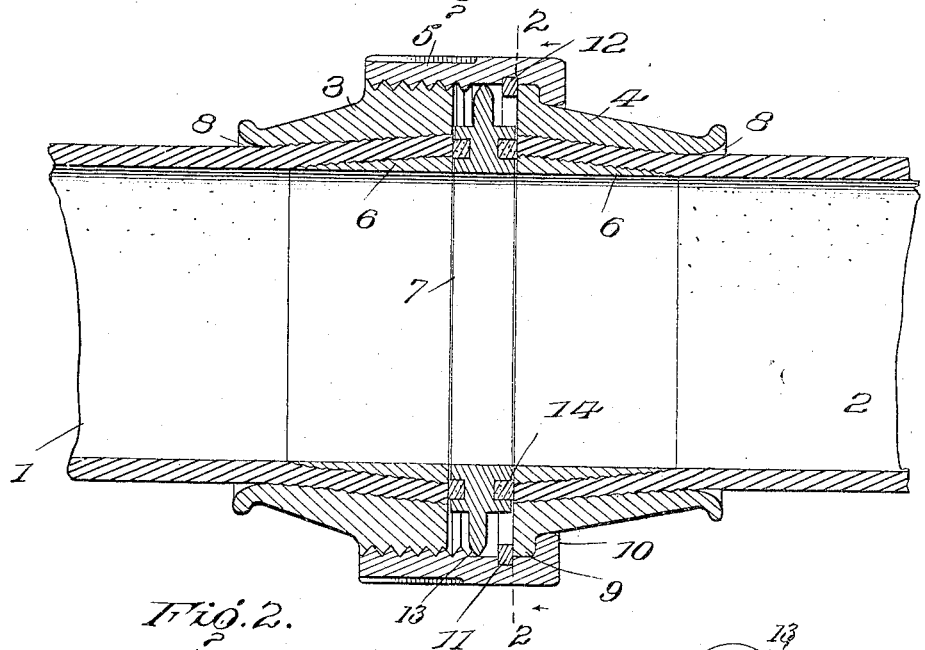
Fig. 1.
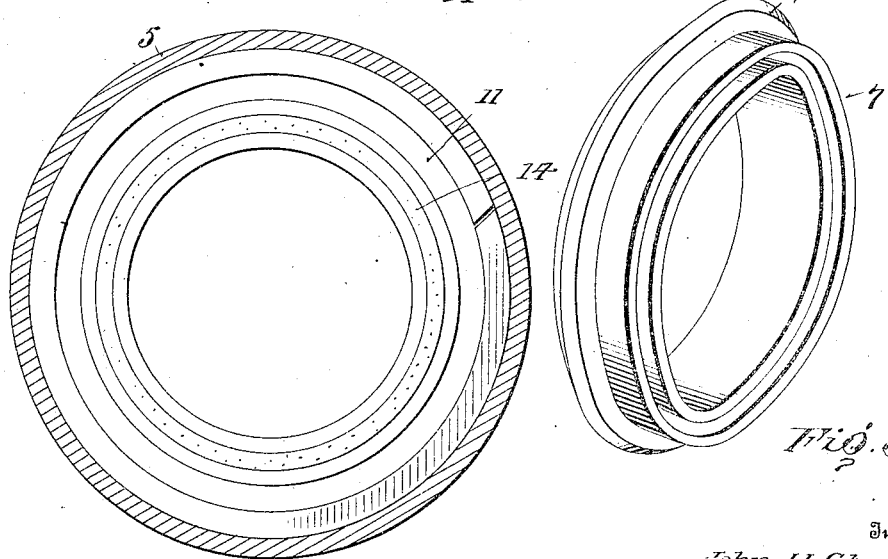
Fig. 2.
Fig. 3.
Inventor
John H. Stephens

UNITED STATES PATENT OFFICE.

JOHN H. STEPHENS, OF VERNON, TEXAS.

HOSE-COUPLING.

951,516.

Specification of Letters Patent.

Patented Mar. 8, 1910.

Application filed June 16, 1908. Serial No. 438,790.

*To all whom it may concern:*

Be it known that I, JOHN H. STEPHENS, citizen of the United States, residing at Vernon, in the county of Wilbarger and State of Texas, have invented certain new and useful Improvements in Hose-Couplings, of which the following is a specification.

In couplings for joined sections of hose it is desirable to secure tight and reliable joints to prevent leaking and to guard against pulling out of the hose from the fittings which frequently happens in couplers for fire hose which are required to withstand great pressure and linear strain.

The present invention supplies a coupling fulfilling the above noted conditions and which is simple, durable, cheap and easy of manipulation, the coupling members being held in fixed position when tightened by means of a metallic packing clamped between them.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a central longitudinal section of a coupling embodying the invention. Fig. 2 is a transverse section on the line 2—2 of Fig. 1, looking in the direction of the arrows. Fig. 3 is a detail perspective view of the metallic packing ring.

Corresponding and like parts are referred to in the following description and indicated in all the views of the drawings by the same reference characters.

The numerals 1 and 2 represent the ends of two hose sections which are joined by means of the improved coupling, the latter comprising complemental coupling members 3 and 4, a swivel connection 5, expanding rings 6 and a metallic packing ring 7. The expanding rings 6 are tapered and inserted in the ends of the respective hose sections 1 and 2. The coupling members encircle the end portions of the hose sections and confine the same to the expanding rings. The outer ends of the expanding rings, hose sections and coupling members are substantially flush to insure the formation of a tight joint between them and the metallic packing ring 7 interposed between said parts, as indicated most clearly in Fig. 1.

The inner ends of the shanks of the coupling members are flared, as indicated at 8, to prevent injury to the hose, which would otherwise result if sharp corners were provided for the hose to come in contact with. The coupling members are tapered throughout their length and are roughened or provided upon their inner walls with a series of annular grooves or ribs to make positive engagement with the hose to prevent possible slipping thereof. The coupling member 3 is exteriorly threaded at its outer end to match the internal screw threads of the swivel connector 5. The outer end of the coupling member 4 has an outer flange 9 to engage with an inner flange 10 at the inner end of the swivel connector. A split ring 11 is sprung into an annular groove 12 formed in the inner wall of the swivel connector a short distance from the inner flange 10.

The metallic packing ring 7 is of a size to fit between the opposing ends of the hose sections and coupling members. To prevent misplacement of the packing ring and to have the same at hand for immediate use when required, the same is constructed to be carried by the swivel connector 5. For this purpose the metallic packing ring is formed with an outer flange 13 whose outer edge is tapered to match the inner screw threads of the swivel connector. The inner screw threads of the swivel connector terminate a short distance from the ring 12, leaving a plain surface or space in which the metallic packing ring has free play. Annular grooves are formed in opposite faces of the metallic packing ring and receive gaskets 14 of rubber, leather or like packing material commonly employed for securing tight joints in couplings. The packing gaskets 14 project a short distance beyond the faces of the metallic packing ring so as to engage with the ends of the hose sections and coupling members to insure the formation of water tight joints. When two hose sections are connected by a coupling embodying the invention, the metallic packing ring is clamped between the sections, as indicated in Fig. 1, the metal portions coming together prevent any relative play of the coupling members which happens when a packing of rubber, or leather, or the like, solely is interposed between the parts to be coupled, said parts having relative play when subjected to lateral strain with the result that a leaky joint is formed. By having the metallic packing ring interposed between the parts of the coupling, all are held rigidly in alinement and there is no play resulting from lateral strain, hence the engaging surfaces remain in contact.

Having thus described the invention, what is claimed as new is:

1. In a device of the character described, the combination of a coupling member, a swivel connector coöperating therewith and having its interior screw threaded to within a short distance of its inner end leaving a plain portion between the extremity of the coupling member and the inner end of the screw threaded portion, and a metal packing arranged within the swivel connector and having an outer flange formed at its outer edge with a screw thread to match the screw threads of the swivel connector, said outer flange being confined in the plain space formed between the screw threaded portion of the swivel connector and the extremity of the coupling member.

2. In a device of the character specified the combination of a coupling member having an outer flange, a swivel connector having an inner flange to engage the outer flange of the coupling member and provided with an inner annular groove, and having its interior screw threaded to within a short distance of said annular groove to leave a plain portion, forming a space, a ring sprung into said annular groove to confine the outer flange to the swivel connector, and a metal packing arranged within the swivel connector and having an outer flange terminating at its outer edge in a screw thread which matches the screw thread portion of the swivel connector, said outer flange being confined between the screw thread portion of the swivel connector and said ring.

3. In combination hose-pipe ends, inner and outer metal coupling members receiving terminal portions of said hose-pipe ends, a swivel connector for uniting the outer coupling members, and a metallic packing arranged between the coupling members and the hose-pipe ends and having its opposite sides grooved leaving portions intact to engage with the inner and outer metallic coupling members, and having yieldable packing inserted in the said grooves to make contact with the adjacent extremities of said hose-pipe ends.

4. In a device of the character described, a coupling member, a swivel connector operating therewith, and having an interior screw thread terminating short of the inner ends of the connector leaving a plain portion between the extremity of the coupling member and the inner end of the screw threaded portion, and a metal packing formed with an exterior screw thread arranged to match the screw threads of the swivel connector and another coupling member arranged for connection with the swivel connector and adapted to hold the packing with its exterior in the plain space formed between the screw threaded portion of the swivel connector and the extremity of the first named coupling member.

5. In a device of the character described, the combination of an outer coupling member having an outer flange, a swivel connector having an inner flange to engage the flange of the coupling member and provided with an inner annular groove, a ring adapted to be sprung into the annular groove and within the outer flange of said swivel connector, another outer coupling member arranged to engage the swivel connector, an inner coupling member coacting with the outer coupling member, and a packing interposed between the ends of the coupling members.

6. In combination, hose pipe ends, inner and outer metal coupling members receiving the terminal portions of said hose pipe ends, a swivel connector for uniting the outer coupling members and a metallic packing arranged between the coupling members and the hose-pipe ends and having its opposite sides grooved in registry with said hose-pipe ends leaving portions intact to engage with the opposing ends of both the inner and outer metallic coupling members and yieldable packing inserted in said groove to engage with the adjacent extremities of said hose pipe ends.

In testimony whereof I affix my signature in presence of two witnesses.

JOHN H. STEPHENS. [L. S.]

Witnesses:
V. B. HILLYARD,
W. N. WOODSON.